UNITED STATES PATENT OFFICE.

HENRY BRAUNHOLD, OF NEW YORK, N. Y.

IMPROVEMENT IN FOOD FOR HORSES AND CATTLE.

Specification forming part of Letters Patent No. 210,087, dated November 19, 1878; application filed October 4, 1878.

*To all whom it may concern:*

Be it known that I, HENRY BRAUNHOLD, of the city, county, and State of New York, have invented a new and Improved Food for Horses and Cattle, which invention is fully set forth in the following specification.

My invention consists in an article of food for horses and cattle, prepared from brewers' grains by mixing with the grains immediately after their removal from the vat a sufficient quantity of salicylic acid to preserve the same, and afterward drying the whole by natural or artificial heat, as more fully hereinafter set forth.

In carrying out my invention I take about one bushel of brewers' grains, immediately after their removal from the vat, and while in a moist condition add about one-half ounce of salicylic acid, after which I subject the mass to either natural or artificial heat until the moisture is entirely driven off.

In order to produce a useful and wholesome article of food from brewers' grains, it is essential that the grains thus treated be not only thoroughly dried, but dried rapidly. To this end I have found it advantageous to mix with the mass some absorbent nutritious substance which will take up as much as possible of the grain, and for the same reason I prefer to employ artificial heat for drying the mass.

In practice, I have found that bran answers admirably for this purpose, in about the proportion of one-fourth of a bushel to every bushel of the brewers' grains.

In drying the mass any suitable desiccating apparatus may be employed; but I use, by preference, an ordinary malt-kiln, the mass being placed therein and heated, in the usual manner, until thoroughly dried.

The salicylic acid serves not only to arrest the decomposition of the grains previous to and during the drying of the same, but serves to arrest and prevent the ultimate decay of the compound which would otherwise take place, rendering the article useless for the intended purpose.

I am aware that brewers' grain has been combined with salt as a preservative to prevent decomposition, and, further, that sulphites have been combined with brewers' grain for accomplishing the same purpose; therefore, as such are not within the scope of my invention, they are hereby disclaimed.

What I claim is—

As a new article of food, a compound consisting of brewers' grains intimately mixed with salicylic acid and dried by natural or artificial heat, substantially as specified.

In testimony that I claim the foregoing I hereunto set my hand and seal this 26th day of September, 1878.

H. BRAUNHOLD. [L. S.]

Witnesses:
W. HAUFF,
E. F. KASTENHUBER.